United States Patent
Popovich et al.

(10) Patent No.: US 10,664,035 B2
(45) Date of Patent: May 26, 2020

(54) RECONFIGURABLE POWER DELIVERY NETWORKS

(71) Applicant: QUALCOMM Incorporated, San Diego, CA (US)

(72) Inventors: Mikhail Popovich, San Marcos, CA (US); Juan Sebastian Ochoa Munoz, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 15/692,456

(22) Filed: Aug. 31, 2017

(65) Prior Publication Data

US 2019/0064906 A1  Feb. 28, 2019

(51) Int. Cl.
*G11C 5/14* (2006.01)
*G06F 1/32* (2019.01)
*G06F 1/26* (2006.01)

(52) U.S. Cl.
CPC . *G06F 1/32* (2013.01); *G06F 1/26* (2013.01)

(58) Field of Classification Search
CPC .................................. G06F 1/32; G06F 1/26
USPC .................................................. 365/226, 63
See application file for complete search history.

(56) References Cited

U.S. PATENT DOCUMENTS

| | | | |
|---|---|---|---|
| 5,883,814 A * | 3/1999 | Luk .................... | G06F 17/5068 716/104 |
| 6,577,543 B2 * | 6/2003 | Naritake ............. | G11C 11/4074 365/189.08 |
| 6,925,627 B1 * | 8/2005 | Longway ............ | G06F 17/5077 257/207 |
| 7,209,366 B2 * | 4/2007 | Prokofiev ............... | H01L 23/50 174/520 |
| 7,778,041 B2 * | 8/2010 | Howell ................ | H05K 1/0262 361/700 |
| 7,886,431 B2 * | 2/2011 | Weir ....................... | H01L 23/66 29/831 |
| 8,018,738 B2 * | 9/2011 | Doblar ................. | H05K 7/1061 174/260 |
| 8,050,129 B2 * | 11/2011 | Liu ..................... | G04B 37/0481 365/225.7 |
| 8,077,517 B2 * | 12/2011 | Wang ....................... | G11C 5/04 365/154 |
| 8,161,446 B2 * | 4/2012 | Qiu ..................... | G06F 17/5077 716/126 |
| 8,305,831 B2 * | 11/2012 | Lee ........................ | G11C 11/413 365/226 |
| 8,331,188 B2 * | 12/2012 | Nakaoka ................ | G11C 5/147 365/189.09 |
| 8,406,075 B2 * | 3/2013 | Lee ........................ | G11C 11/413 365/226 |
| 8,488,406 B2 * | 7/2013 | Jinbo ........................ | G05F 3/16 365/189.04 |
| 8,687,452 B2 * | 4/2014 | Kishibe ................ | G11C 11/417 365/226 |
| 8,756,445 B2 * | 6/2014 | Walsh .................... | G06F 1/266 713/323 |

(Continued)

*Primary Examiner* — Viet Q Nguyen
(74) *Attorney, Agent, or Firm* — Qualcomm Incorporated

(57) ABSTRACT

In certain aspects, an integrated circuit comprises a first circuit macro having a first power delivery network, a second circuit macro having a second power delivery network. The integrated circuit further comprises a coupling circuit couples to the first power delivery network and to the second power delivery network.

26 Claims, 5 Drawing Sheets

(56) References Cited

U.S. PATENT DOCUMENTS

| | | | | |
|---|---|---|---|---|
| 9,094,008 B2* | 7/2015 | Lee | ............ | H03K 17/102 |
| 9,134,777 B2* | 9/2015 | Kolla | ............ | G06F 1/26 |
| 9,377,804 B2* | 6/2016 | Coutts | ............ | G05F 3/02 |
| 9,766,675 B2* | 9/2017 | Uan-zo-li | ............ | G06F 1/266 |
| 9,799,604 B2* | 10/2017 | Byun | ............ | H01L 23/5286 |
| 9,871,506 B2* | 1/2018 | Coutts | ............ | H03K 17/16 |
| 10,042,404 B2* | 8/2018 | Gangwar | ............ | G06F 1/26 |
| 10,078,358 B2* | 9/2018 | Ochoa Munoz | ............ | G06F 1/26 |
| 10,318,694 B2* | 6/2019 | Chung | ............ | G06F 30/327 |
| 2003/0034825 A1* | 2/2003 | Hsu | ............ | G11C 5/14 |
| | | | | 327/530 |
| 2005/0204324 A1* | 9/2005 | Lin | ............ | G06F 17/5077 |
| | | | | 257/532 |
| 2005/0207131 A1* | 9/2005 | Prokofiev | ............ | H01L 23/50 |
| | | | | 361/760 |
| 2007/0047365 A1* | 3/2007 | Yoshinaga | ............ | G11C 5/147 |
| | | | | 365/226 |
| 2007/0201295 A1* | 8/2007 | Lines | ............ | G11C 5/14 |
| | | | | 365/230.03 |
| 2007/0216467 A1* | 9/2007 | Akiyama | ............ | G11C 5/025 |
| | | | | 327/389 |
| 2008/0137465 A1* | 6/2008 | Katayama | ............ | G11C 5/147 |
| | | | | 365/226 |
| 2010/0077370 A1* | 3/2010 | Qiu | ............ | G06F 17/5045 |
| | | | | 716/125 |
| 2010/0157692 A1* | 6/2010 | Wang | ............ | G11C 5/04 |
| | | | | 365/189.09 |
| 2010/0238751 A1* | 9/2010 | Dell | ............ | G11C 5/063 |
| | | | | 365/226 |
| 2010/0254209 A1* | 10/2010 | Lee | ............ | G11C 5/063 |
| | | | | 365/226 |
| 2011/0095801 A1* | 4/2011 | Bjerregaard | ............ | G06F 1/10 |
| | | | | 327/270 |
| 2011/0141838 A1* | 6/2011 | Kishibe | ............ | G11C 11/417 |
| | | | | 365/226 |
| 2011/0167287 A1* | 7/2011 | Walsh | ............ | G06F 1/266 |
| | | | | 713/323 |
| 2011/0283130 A1* | 11/2011 | Pai | ............ | G06F 1/26 |
| | | | | 713/330 |
| 2011/0310690 A1* | 12/2011 | Huang | ............ | G11C 5/147 |
| | | | | 365/226 |
| 2012/0013356 A1* | 1/2012 | Eckert | ............ | G01R 31/31721 |
| | | | | 324/750.3 |
| 2012/0266121 A1* | 10/2012 | Newcomb | ............ | G06F 17/5036 |
| | | | | 716/109 |
| 2013/0320769 A1* | 12/2013 | Sawyers | ............ | G06F 1/263 |
| | | | | 307/80 |
| 2015/0171631 A1* | 6/2015 | Duell | ............ | H02J 3/46 |
| | | | | 307/80 |
| 2016/0246363 A1* | 8/2016 | Chen | ............ | G06F 1/3296 |
| 2016/0357245 A1* | 12/2016 | Heo | ............ | G06F 1/3296 |
| 2016/0365753 A1* | 12/2016 | Lee | ............ | H02J 50/20 |
| 2017/0179957 A1* | 6/2017 | Kapoor | ............ | G06F 1/3296 |
| 2017/0308153 A1* | 10/2017 | Chou | ............ | G06F 1/3287 |
| 2017/0358947 A1* | 12/2017 | Waters | ............ | H02J 1/00 |
| 2018/0052574 A1* | 2/2018 | Wolfe | ............ | G06T 11/206 |
| 2018/0062400 A1* | 3/2018 | Wang | ............ | H02J 7/045 |
| 2018/0144086 A1* | 5/2018 | Chung | ............ | G06F 30/392 |
| 2018/0350762 A1* | 12/2018 | Gu | ............ | H01L 21/486 |
| 2019/0101951 A1* | 4/2019 | Sather | ............ | G06F 1/263 |

\* cited by examiner

RECONFIGURABLE POWER DELIVERY NETWORKS

BACKGROUND

Field

Aspects of the present disclosure relate generally to power management, and more particularly, to methods and apparatuses to reconfigure the power delivery networks.

Background

Advances in technology have resulted in smaller and more powerful personal computing devices. Within such devices, the circuitry is becoming smaller, and power consumption by the circuitry is becoming increasingly significant. Furthermore, system-on-a-chip (SoC) technology is used in small, increasingly complex consumer electronics, such as servers, laptops, smartphones, tablets, wearables, digital cameras, wireless routers and so on. A complex SoC may contain digital, analog, mixed-signal, and often radio-frequency circuitry—all in a single die. A complex SoC may also include the on-chip integration of multiple general processor cores, graphic processing unit, video processor, image processor, audio/video decoder, modem, memory, etc. The different types of circuitry or the different functional blocks may operate under different operational modes. Each may require a dedicate power delivery network. Each may compete against others for limited resources allocated for power distribution.

As chips have become smaller, the resistance of metal layers within a silicon substrate has increased while the power densities have also increased. In addition, the number of power domains and power rails keeps increasing to reduce power consumption of the chip (e.g., through dynamic clock and voltage scaling). To address the increased power densities and increased number of power rails, additional thick metal layers may be added on die, packaging substrate, and/or PCB for power delivery networks to lower the resistive and inductive losses in the distribution networks. However, such designs increase routing complexity and cost and decrease available area for signal routing. Furthermore, there are limited number of packaging bumps or bonding pads available to deliver the power to the on-die circuitry. The integration of more functionalities in one die demands more packaging bumps and bonding pads for power and signals, yet with the scaling of the chip, the number of packaging bumps and the bonding pads is greatly reduced.

Accordingly, there is a need for an improved power distribution system and method for continued process scaling and increased system integration that reduces power loss and improves performance.

SUMMARY

The following presents a simplified summary of one or more implementations to provide a basic understanding of such implementations. This summary is not an extensive overview of all contemplated implementations, and is intended to neither identify key nor critical elements of all implementations nor delineate the scope of any or all implementations. The sole purpose of the summary is to present concepts relate to one or more implementations in a simplified form as a prelude to a more detailed description that is presented later.

In one aspect, an integrated circuit comprises a first circuit macro having a first power delivery network and a second circuit macro having a second power delivery network. The integrated circuit further comprises a coupling circuit couples to the first power delivery network and to the second power delivery network.

In another aspect, a method comprises supplying power to a first circuit macro through a first power delivery network; supplying power to a second circuit macro through a second power delivery network. The method further comprises coupling the first power delivery network to the second power delivery network through a coupling circuit.

In another aspect, a system comprises a packaging substrate, a first power delivery network, and a second power delivery network. The system further comprises a plurality of bonding pads couple an integrated circuit die to the packaging substrate. A first set of the plurality of bonding pads couples to the first power delivery network and a second set of the plurality of bonding pads couples to the second power delivery network. The system also includes a coupling circuit couples to the first power delivery network and to the second power delivery network.

In another aspect, a device comprises a first circuit macro having a first power delivery network and a second circuit macro having a second power delivery network. The device further comprises means for coupling the first power delivery network to the second power delivery network.

To accomplish the foregoing and related ends, one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various aspects and is not intended to represent the only aspects in which the concepts described herein may be practiced. The detailed description includes specific details for the purpose of providing an understanding of the various concepts. However, it will be apparent to those skilled in the art that these concepts may be practiced without these specific details. In some instances, well-known structures and components are shown in block diagram form in order to avoid obscuring such concepts.

The last generation of semiconductor products has seen increasingly aggressive current densities that need to be managed with ever shrinking power distribution resources. Due to area and cost reduction, more functionalities, more power domains, and/or more circuit macros are integrated, yet fewer packaging bumps, fewer bonding pads, and fewer metal layers on die, packaging substrate, or on board are available. As a result, conventional power distribution system may not be able to supply the required power to the on-die circuitry, jeopardizing the circuit performance. In addition, current density may reach or exceed the maximum current limit a packaging bump, a bonding pad, or a metal line can carry, resulting in electromigration failure.

According to certain aspects of the present disclosure, power delivery networks for different circuit macros may be shared. Packaging bumps, bonding pads, and/or metal lines used for one circuit macro may be reconfigured to supply power to another circuit macro. A coupling circuit may be placed between two circuit macros with distinct power delivery networks. The power delivery networks may be reconfigured to be electrically coupled and/or merged. The power delivery networks may be reconfigured dynamically depending on an operation mode or statically depending on the market need or depending on other conditions.

Figure 1:
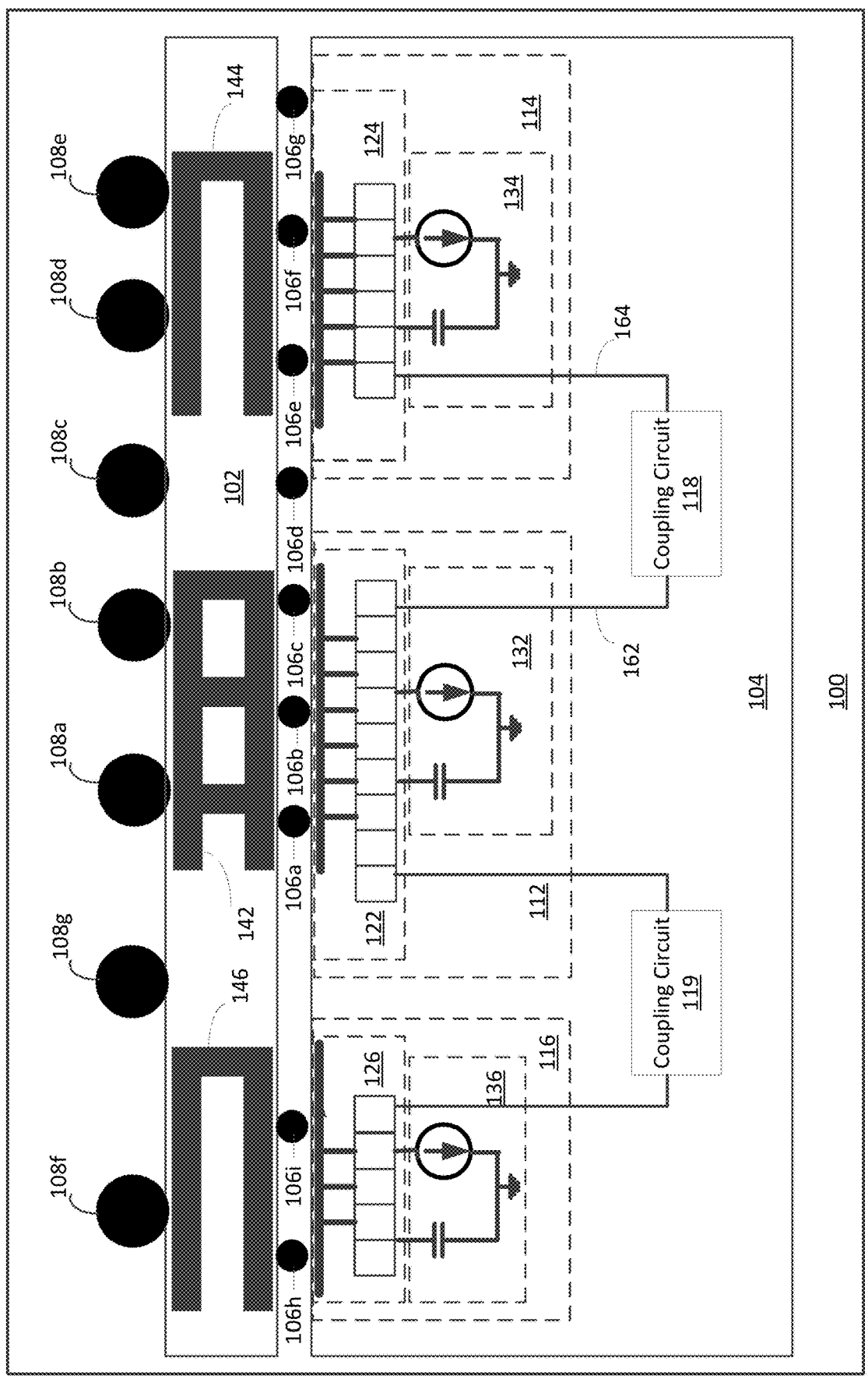
FIG. 1 illustrates an exemplary implementation of a SoC chip according to certain aspects of the present disclosure.

FIG. 1 illustrates an exemplary implementation of a SoC chip according to certain aspects of the present disclosure. The SoC Chip 100 comprises a packaging substrate 102, an integrated circuit die 104, a plurality of bonding pads 106a-106i coupled to both the packaging substrate 102 and the integrated circuit die 104, and a plurality of packaging bumps 108a-108g coupled to the packaging substrate 102. The integrated circuit die 104 further comprises a plurality of circuit macros 112, 114, and 116. The circuit macro 112 comprises a power delivery network 122 supplying power to its circuitry 132, represented by a capacitor and a current source. Similarly, the circuit macro 114 comprises a power delivery network 124 supplying power to its circuitry 134; and the circuit macro 116 comprises a power delivery network 126 supplying power to its circuitry 136. The packaging substrate 102 comprises corresponding metal traces supplying power to each of the circuit macros 112, 114, and 116 through respective bonding pads. For example, a metal trace 142 supplies power through the bonding pads 106a-106d to the circuit macro 112; a metal trace 144 supplies power through the bonding pads 106e-106f to the circuit macro 114; and a metal trace 146 supplies power through the bonding pads 106h-106i to the circuit macro 116. Each of the metal traces 142, 144, and 146 also connect to the respective packaging bumps. For example, the metal trace 142 connects to the packaging bumps 108a-108b; the metal trace 144 connects to the packaging bumps 108d-108e, and the metal trace 146 connects to the packaging bump 108f. The numbers of packaging bumps, bonding pads, metal traces, circuit macros shown in FIG. 1 are for illustration purpose only. The numbers may be smaller or larger. Similarly, the number of bonding pads coupled to each circuit macro and the number of packaging bumps coupled to each metal trace are for illustration purpose, too. Actual numbers may be smaller or larger.

Each of the power delivery networks 122, 124, and 126 typically comprises one or more metal layers in the integrated circuit die 104. Different power delivery networks may use same metal layers or different metal layers. Likewise, each of the metal traces 142, 144, and 146 may comprise one or more metal layers in the packaging substrate 102; and they may reside in the same metal layers or different metal layers.

The term bonding pads (e.g., the bond pads 106a-106i) refer to the connections between the packaging substrate 102 and the integrated circuit die 104. They may be thin wires (e.g., in wire bonding technology), solder balls (e.g., in flip chip technology), copper pillars, or any other suitable metals, or some combination thereof. The term packaging bump (e.g., the packaging bumps 108a-108g) refer to the terminals that an integrated circuit chip or a SoC chip may connect to external components. Many types of packaging bumps may be created through different assembly technologies, such as Ball Grid Array (BGA), Pin Grid Array (PGA), Quad Flat Package (QFP), or any other suitable technologies. The bonding pads and the packaging bumps may be used to carry signals, clock, power, and/or ground.

Each of the circuit macros 112, 114, and 116 may require a dedicated power delivery network. In other words, the power delivery network for one circuit macro (e.g., the circuit macro 112) is different from the power delivery network for another circuit macro (e.g., the circuit macro 114). One power delivery network does not directly supply power to the two circuit macros (e.g., the circuit macros 112 and 114). For example, the power delivery network 122 is allocated for the circuit macro 112; the power delivery network 124 is allocated for the circuit macro 114; and the power delivery network 126 is allocated for the circuit macro 116. Each of the dedicated power delivery networks 122, 124, and 126 may receive power through a dedicated metal trace in the packaging substrate 102, as illustrated in FIG. 1. For example, the power delivery network 122 receives power through the metal trace 142; the power delivery network 124 receives power through the metal trace 144; and the power delivery network 126 receives power through the metal trace 146. Alternatively, each of the power delivery networks may receive power from one or more on-die power regulators or power management units (not shown). Alternatively, some of the dedicated power delivery networks may receive power from the on-die power regulators or power management units and some may receive power through metal traces in the packaging substrate. Other alternatives are possible for supplying power to the circuit macros.

In a complex SoC system, various power management schemes are employed. For example, each of the circuit macros 112, 114, and 116 may operate under different supply voltage levels. A mixed signal circuit, such as a phase locked loop (PLL), a digital-to-analog converter (DAC), or an analog-to-digital converter (ADC), may be designed with thick oxide transistors and powered by a relatively high supply voltage. A processor or a memory, on the other hand, may be designed with thin oxide transistors and powered by a relatively low supply voltage. The supply voltage and the operating frequency applied to each of the circuit macros 112, 114, and 116 may be adjusted according to its operation mode. For example, a supply voltage and a frequency of a clock to a processor or a memory may be scaled down to conserve energy if the workload is relatively light. The supply voltage to some or all of the circuit macros 112, 114, and 116 may collapse (e.g., by head switches) and the circuit macros may be in a sleep mode so that they consume almost zero energy. Alternatively, the clocks to some or all of the circuit macros 112, 114, and 116 may be gated off during a standby mode so that the corresponding circuit macros only consume leakage power.

With such various and diverse power management schemes, each circuit macro is usually allocated a different power delivery network (e.g., the power delivery network 122, 124, or 126). Each of the power delivery networks is not directly coupled to each other. However, a circuit macro may be in a sleep or standby mode or other low power mode. The power that the circuit macro needs may be below the full capacity of the power delivery network assigned. For example, when a circuit macro is in a sleep or standby mode, it needs zero or very small current. The power delivery network for this circuit macro may be totally unused or underutilized. It would be beneficial if the unused or underutilized power distribution resource can be reconfigured to supply power to a circuit macro that demands high level of current and power.

FIG. 1 further illustrates an exemplary implementation that reconfigures an unused or underutilized power delivery network of a circuit macro for another circuit macro. The SoC chip further comprises a coupling circuit 118 with one terminal 162 coupled to the power delivery network 112 and another terminal 164 coupled to the power delivery network 124. The coupling circuit 118 is configured to couple the power delivery network 122 to the power delivery network 124 through terminals 162 and 164 under certain circumstances. For example, when the circuit macro 114 is in a low power mode (e.g., in a sleep or standby mode or other mode that requires less power than the power delivery network 124 can supply), while the circuit macro 112 is in a high performance mode, the power delivery network 124 may be coupled to the power delivery network 122. Typically, a power delivery network is designed to support the maximum performance of a circuit macro. When the circuit macro 114 is in a low power mode, it may demand a power level below the full capacity of the power delivery network 124. The circuit macro 112, which is in a high performance mode, may demand a high power level close to the full capacity of the power delivery network. When the power delivery network 124 couples to the power delivery network 122 through the coupling circuit 118, the circuit macro 122 may receive power through the power delivery network 124 in addition to receive power from the power delivery network 122. The voltage drop in the power delivery network due to resistive loss (e.g., IR drop) and/or inductive loss (e.g., L di/dt drop) is reduced. Part of the current required by the circuit macro 122 may be carried by the power delivery network 124. Electromigration is mitigated and voltage drop is further reduced since there are more bonding pads (e.g., the bonding pads allocated for the power delivery network 124) available to supply the power to the circuit macro 112. In addition, the decoupling capacitors (not shown) for the power delivery network 124 are coupled to the power delivery network 122 when the power delivery network 124 couples to the power delivery network 122. The added decoupling capacitors further improve circuit performance by suppressing high-frequency noise in the power supply signals. Moreover, by carrying part of the power to the circuit macro 112 through the underutilized power delivery network 124, electromigration is mitigated, thus improving the integrity and robustness of the power distribution system.

The reconfiguration of the power delivery networks may not be limited to two power delivery networks. More power delivery networks may be reconfigured and used by an associated circuit macro. For example, in addition to the use of the power delivery network 124 for circuit macro 112, the power delivery network 126 may be coupled to the circuit macro 112. When the circuit macro 116 is in a low power mode, such as in a sleep or standby mode while the circuit macro 112 is in a high performance mode, the power delivery network 126 may be coupled to the power delivery network 122 through a coupling circuit 119. More power delivery networks from other circuit macros may also be similarly coupled to the power delivery network 122. Alternatively, the power delivery network 122 may couple to the power delivery network 124 in one operation mode and couple to the power delivery network 126 in another operation mode. For example, the circuit macro 114 may be in a low power mode while the circuit macro 116 may be in high performance mode, offering an opportunity to reconfigure the power delivery network 124 for use by the circuit macro 112 but not the power delivery network 126. In another instance, the circuit macro 114 may be in a high performance mode while the circuit macro 116 may be in a low power mode, offering an opportunity to reconfigure the power delivery network 126 for use by the circuit macro 112 but not the power delivery network 124.

Figure 2:
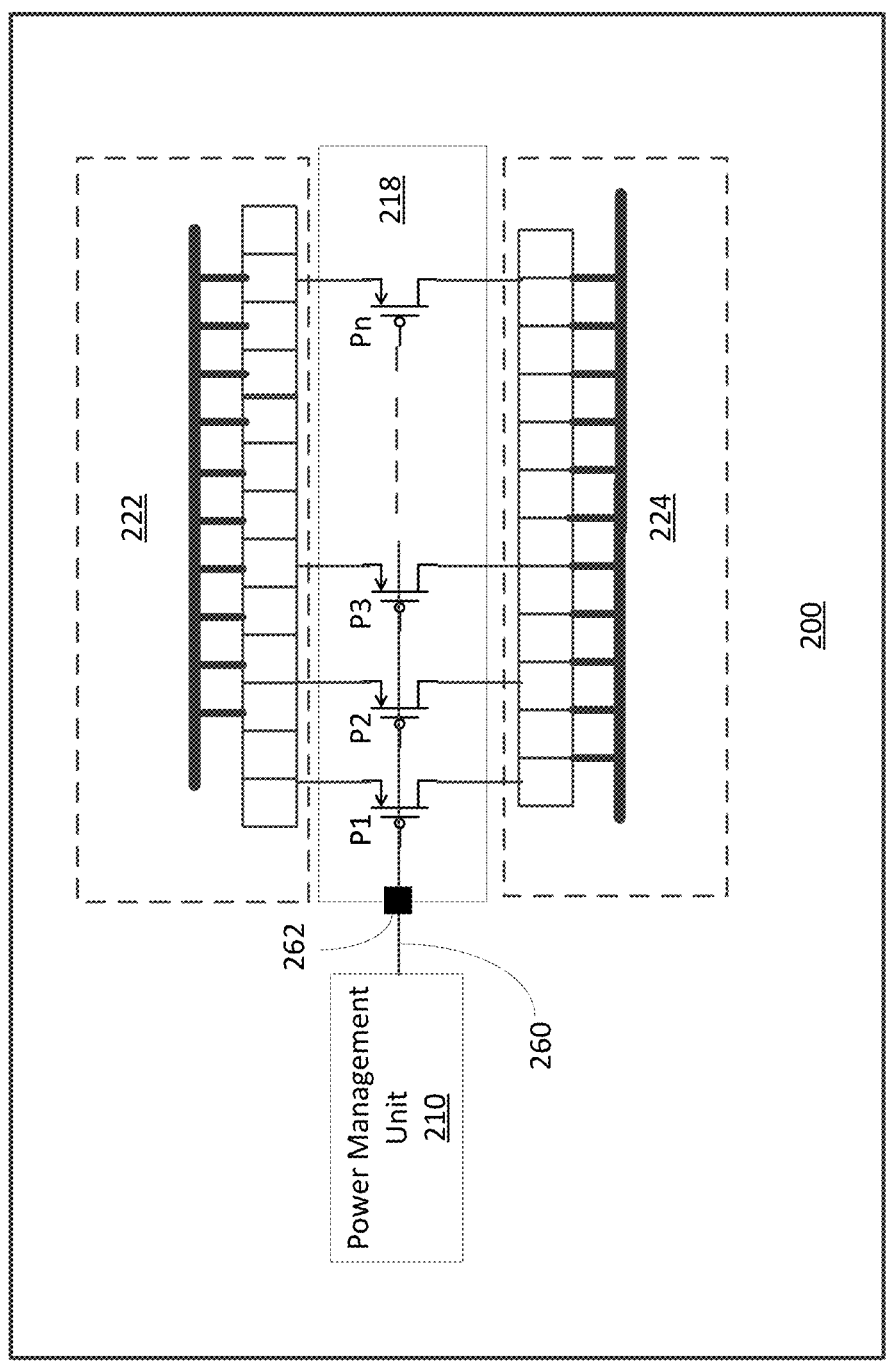
FIG. 2 illustrates an exemplary implementation of a coupling circuit dynamically coupling two power delivery networks according to certain aspects of the present disclosure.

A coupling circuit may couple a power delivery network with another power delivery network in a dynamic or static manner. FIG. 2 illustrates an exemplary implementation of a coupling circuit dynamically coupling two power delivery networks according to certain aspects of the present disclosure. The system 200 comprises a power delivery network 222 for a circuit macro (not shown), a power delivery network 224 for another circuit macro (also not shown), a coupling circuit 218, and a power management unit 210. The power delivery network 222 may, for example, correspond to the power delivery network 122 in FIG. 1; the power delivery network 224 may correspond to the power delivery network 124 or 126 in FIG. 1; and the coupling circuit 218 may correspond to the coupling circuit 118 or 119 in FIG. 1.

The coupling circuit 218 comprises a plurality of PMOS transistors P1, P2, P3, . . . , Pn acting as a plurality of switches. The source and drain of each of the PMOS transistors P1, P2, P3, . . . , Pn couple to the power delivery networks 222 and 224, respectively. The coupling circuit 218 may further comprise a control terminal 262 coupled to the gate of each of the PMOS transistors P1, P2, P3, . . . , Pn. The control terminal couples to the power management unit 210 by a signal line 260. The power management unit 210 may determine whether the power delivery networks 222 and 224 to be coupled/merged. The power management unit 210 send a control signal coupled to the gates of the PMOS transistors P1, P2, P3, . . . , Pn through the signal line 260. The control signal turns on the PMOS transistors P1, P2, P3, . . . , Pn to couple the power delivery networks 222 and 224. A low resistive path is established between the power delivery network 222 and the power delivery network 224. Thus, the power delivery networks 222 and 224 are merged to be one integrated power delivery network, sharing the power distribution resources allocated to both of them, such as the bonding pads, the metal traces in the packaging substrate, the packaging bumps, and/or the decoupling capacitors. When the power management unit 210 determines that both power delivery networks 222 and 224 should be decoupled and each only supplies power to the corresponding circuit macros 112 and 114, the power management unit 210 sends a control signal through the signal line 260 to turn off the PMOS transistors P1, P2, P3, . . . , Pn, thus electrically decouples the power delivery networks 222 and the power delivery network 224.

The power management unit 210 may be implemented via a variety of ways including a finite-state machine, a microcontroller, a software, a firmware, or some combination thereof. The signal line 260 may be one bit or multi-bits.

There may be buffers or drivers inserted in the signal line 260 before it couples to the gates of the PMOS transistors P1, P2, P3, . . . , Pn.

The system 200 may be modified to statically couple or decouple the power delivery networks 222 and 224. In other words, whether two power delivery networks are coupled or decoupled are predetermined and fixed. No change would be made during the operation. If the signal line 260 is configured to be statically coupled to a fixed voltage (e.g., a supply voltage or ground), then the PMOS transistors P1, P2, P3, . . . , Pn are configured to be either permanently turned on or permanently turned off. As a result, the power delivery network 224 may be statically coupled to the power delivery network 222 or statically decoupled to the power delivery network 222. The fixed voltage to the signal line 260 may be provided by a non-volatile memory, such as RRAM, PRAM, MRAM, or a Fuse (not shown). The non-volatile memory may be part of the power management unit 210 and may be programmable by a logic (not shown) in the power management unit 210.

The exemplary coupling circuit 218 in FIG. 2 is illustrated with PMOS transistors P1, P2, P3, . . . , Pn. Other switches may be used to replace PMOS transistors P1, P2, P3, . . . , Pn, such as NMOS transistors, pass gates, and other alternative logic performing similar function.

Figure 3:
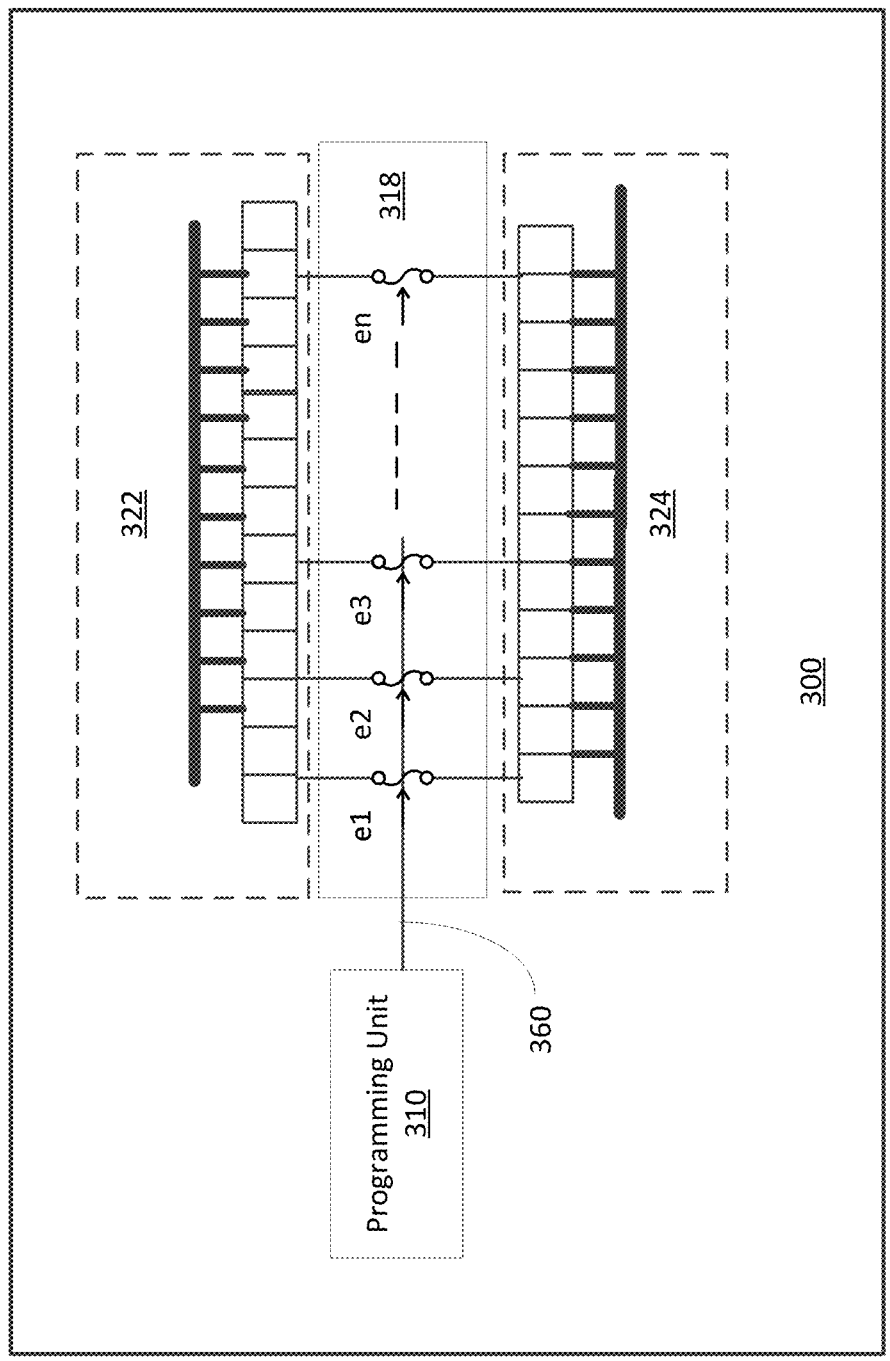
FIG. 3 illustrate an exemplary implementation of a coupling circuit statically coupling or decoupling two power delivery networks according to certain aspects of the present disclosure.

Alternatively, the PMOS transistors P1, P2, P3, . . . , Pn in FIG. 2 may be replaced by a plurality of eFuses to statically (or permanently) couple or decouple two power delivery networks. FIG. 3 illustrate an exemplary implementation of a coupling circuit statically coupling or decoupling two power delivery networks according to certain aspects of the present disclosure. The system 300 comprises a power delivery network 322 for a circuit macro (not shown), a power delivery network 324 for another circuit macro (also not shown), a coupling circuit 318, and a programming unit 310. The power delivery network 322 may correspond to the power delivery network 122 in FIG. 1; the power delivery network 324 may correspond to the power delivery network 124 or 126 in FIG. 1; and the coupling circuit 318 may correspond to the coupling circuit 118 or 119 in FIG. 1.

The coupling circuit 318 comprises a plurality of eFuses e1, e2, e3, . . . , en. One terminal of each of the plurality of eFuses e1, e2, e3, . . . , en couples to the power delivery network 322 and another terminal of each of the plurality of eFuses e1, e2, e3, . . . , en couples to the power delivery network 324. Each of the plurality of eFuses e1, e2, e3, . . . , en also comprises a programming terminal coupled to a programming line 360. An eFuse is a one-time programmable memory that is programmed by forcing a high current density through a conductor link to completely rupture the link or make the resistance significantly higher. There are many types of eFuses, such as poly fuse, metal fuse, MOS floating gate, etc. If the plurality of eFuses e1, e2, e3, . . . , en are not programmed, there is a low resistive path coupling the two power delivery networks 322 and 324. If the plurality of eFuses e1, e2, e3, . . . , en are programmed with a high current, the resistance between two power delivery networks 322 and 324 are high and the power delivery networks 322 and 324 are effectively permanently (or statically) electrically decoupled.

An integrated circuit may be designed for different markets with same circuitry but with different power delivery network configurations due to power, performance, and/or cost constraints. For example, an integrated circuit designed for a handheld device may have stringent power saving requirement. The integrated circuit may be divided into many power domains (or circuit macros). Each with a dedicated power delivery network to facilitate varied power management schemes. The integrated circuit used in an automotive application may face a very different power problem. The power saving requirement may be more relaxed but more robust power delivery networks may be needed due to board and/or packaging limitations. Therefore, an integrated circuit designed for an automotive application may be required to use a lower number of power delivery networks than in a handheld device. By employing the programmable coupling circuit 318 in FIG. 3 or by connecting the signal line 260 to a fixed voltage in FIG. 2, an integrated circuit can be reconfigured and re-used for different markets, e.g, medical, IoT, telematics, automotive, resulting in substantial cost reduction.

While the exemplary coupling circuit 318 in FIG. 3 is illustrated with a plurality of eFuses e1, e2, e3, . . . , en, other types of one-time programmable (OTP) technology may be used, such as antifuses. An antifuse is the opposite of an eFuse. The circuit is open—high resistance—to begin with and is programmed by applying electrical stress that creates a low resistance conductive path. Alternatively, the programmable fuse may not be OTP, but rather a multi-time programmable (MTP).

Figure 4:
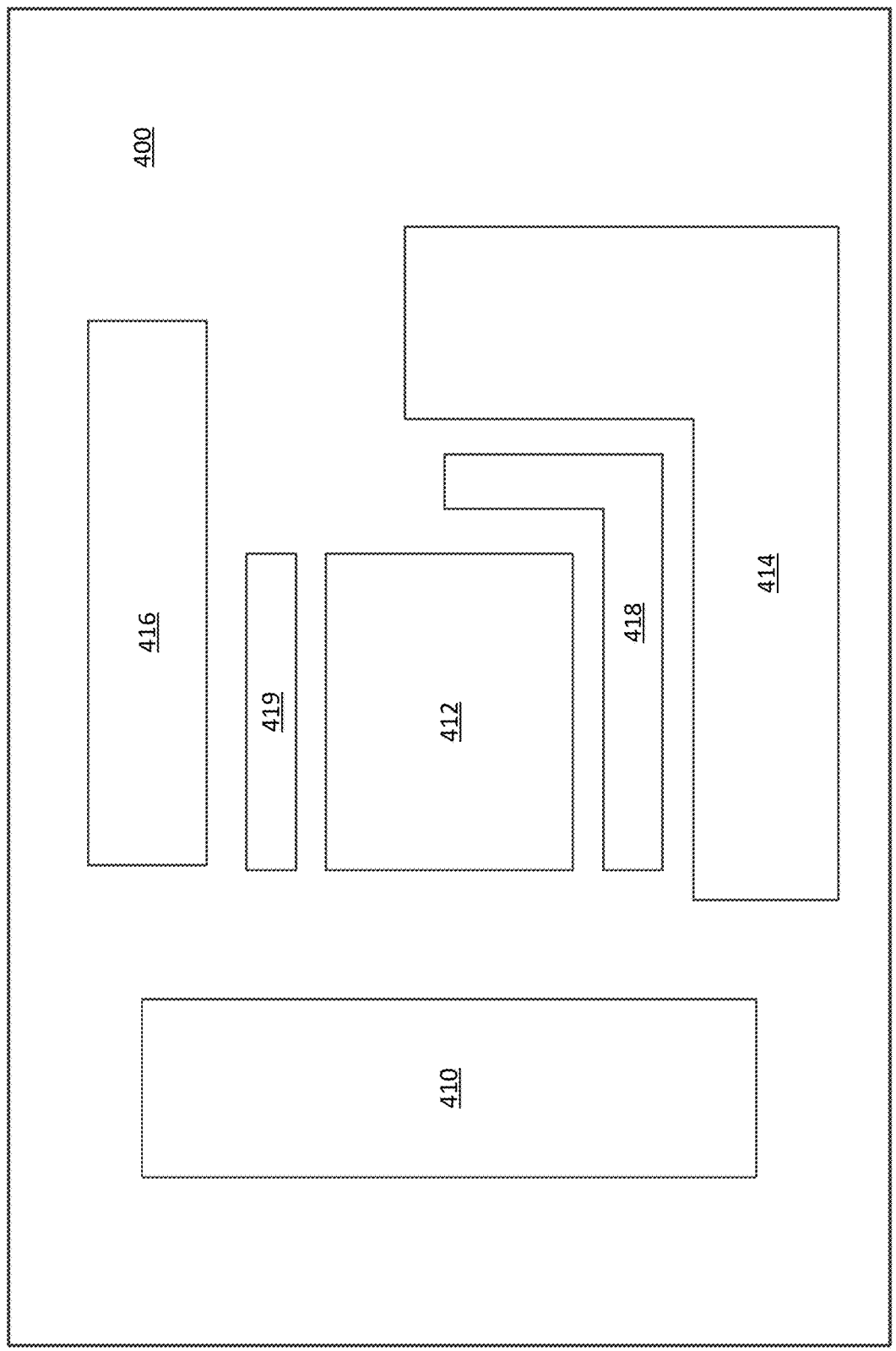
FIG. 4 illustrates an exemplary placement of coupling circuits and circuit macros according to certain aspects of the present disclosure.

FIG. 4 illustrates an exemplary placement of coupling circuits and circuit macros according to certain aspects of the present disclosure. The integrated circuit die 400 comprises a plurality of circuit macros 410, 412, 414, and 416. The integrated circuit die 400 also comprises a first coupling circuit 418. The integrated circuit die 400 may further comprise a second coupling circuit 419. Each of the circuit macros 410, 412, 414, 416 may correspond to one of the circuit macros 112, 114, and 116 in FIG. 1.

If the power delivery networks of two circuit macros are to be coupled and merged, then it is desirable to place the two circuit macros to be close to each other. For example, if the power delivery network of the circuit macro 412 is to be coupled (statically or dynamically) to the power delivery network of the circuit macro 414, then the circuit macro 414 may be placed next to the circuit macro 412. There is no other circuit macros between the circuit macros 412 and 414 other than glue logic. A glue logic is a special form of digital circuitry that allows different types of logic or circuits to work together by acting as an interface between them. The glue logic may include the coupling circuit as will be evident from the following description. Similarly if the power delivery network of the circuit macro 412 is to be coupled to the power delivery network of the circuit macro 416, then the circuit macro 416 may be placed next to the circuit macro 412. There is no other circuit macros between the circuit macros 412 and 416 other than glue logic.

The coupling circuit may be placed adjacent to the two circuit macros to minimize the loss in the coupling circuit. One exemplary implementation is to place the coupling circuit between two circuit macros if it is to couple the corresponding two power delivery networks. That is, the couple circuit is right next to and in-between the two circuit macros. For example, the coupling circuit 418 is configured to couple the power delivery networks of the circuit macros 412 and 414 and is placed between the circuit macros 412 and 414. Ideally, when two power delivery networks are coupled, their voltage level should be the same. However, due to the placement and routing of the power delivery network and the circuit macros, each of the power delivery networks may experience different current flow and result in slightly small voltage difference. One may have a large number of distributive coupling paths between the two power delivery networks so that they have a substantially same voltage level when and if they are coupled. That is, the difference in voltage level may be within a normal voltage fluctuation range of a power delivery network. The coupling circuit may be distributed along the boundary between the circuit macro 412 and the circuit macro 414. Distribution of the coupling circuit along two coupled circuit macros provides more even current distribution among the switches inside the coupling circuit and among the metal lines in the power delivery networks.

Figure 5:
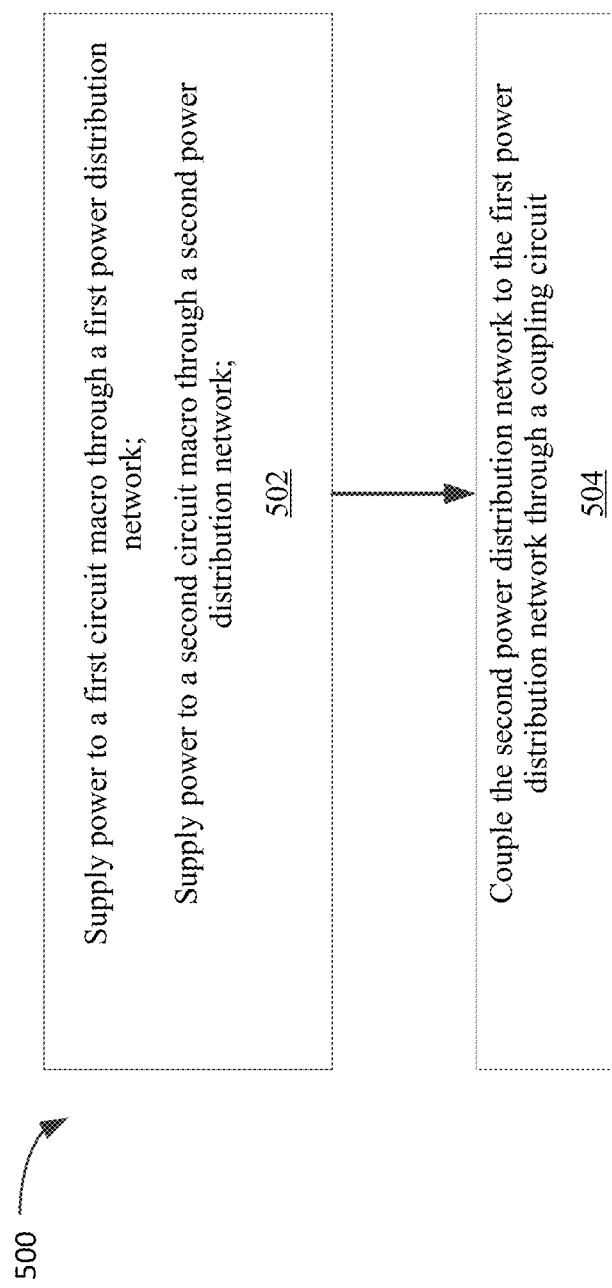
FIG. 5 illustrates an exemplary method for coupling the power delivery networks for circuit macros according to certain aspects of the present disclosure.

FIG. 5 illustrates an exemplary method 500 for coupling the power delivery networks for two circuit macros according to certain aspects of the present disclosure. At 502, power is supplied to a first circuit macro (e.g., the circuit macro 112 or 412) through a first power delivery network (e.g., the power delivery network 122, 222, or 322); power is also supplied to a second circuit macro (e.g., the circuit macro 114, 116, 414, or 416) through a second power delivery network (e.g., the power delivery network 124, 224, or 324).

At 504, the first power delivery network and the second power delivery network are coupled through a coupling circuit (e.g., the coupling circuit 118, 119, 218, 318, 418, or 419). The coupling circuit may couple the second power delivery network to the first power delivery network dynamically or statically. A power management unit may be coupled to the coupling circuit. Under the control of the power management unit, the coupling circuit may dynamically couple the second power delivery network to the first power delivery network when the first circuit macro demands high power consumption and the second circuit macro operates in a low power mode. The coupling circuit may comprise a plurality of switches. The plurality of switches couple the second power delivery network to the first power delivery network dynamically in response to a control signal. Alternatively, the coupling circuit is configured to statically couple the second power delivery network to the first power delivery network for different market applications. Alternatively, the coupling circuit is one-time programmable or multi-time programmable and is programmed to couple or decouple two power delivery networks.

Although method 500 only illustrates the coupling of two power delivery networks, the method 500 may further comprises coupling an additional power delivery network to the first power delivery network. For example, there may be a third power delivery network couples to the first power delivery network through another coupling circuit. Alternatively, the first power delivery network may couple to the second power delivery network in one operation mode and couple to the third power delivery network in another operation mode.

The illustrated power delivery networks in FIGS. 1-5 are discussed as residing in the integrated circuit die, however, apparatuses and methods of various embodiments of the present disclosure may reside in a packaging substrate, in a printed circuit board (PCB), or any combination thereof. The coupling circuits may reside in a power management integrated circuit (PMIC) die or a standalone die or any other types of dies. The PMIC or the standalone die or other dies may be assembled with one or more integrated circuit dies as one chip. The plurality of circuit macros need not all reside in one integrated circuit die, rather they may be distributed in multiple dies or multiple chips. The power delivery system may be implemented in servers, laptops, smartphones, tablets, wearables, digital cameras, wireless routers and so on. At a system level, many of the embodiments disclosed herein improve power delivery networks by consolidating resources not only on the integrated circuit dies, but on the packaging substrates as well as on PCBs.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An integrated circuit, comprising:
   a first circuit macro having a first power delivery network;
   a second circuit macro having a second power delivery network; and
   a coupling circuit coupled to the first power delivery network and to the second power delivery network, wherein the coupling circuit is configured to merge the first power delivery network and the second power delivery network in response to a power control signal.

2. The integrated circuit of claim 1, wherein the first power delivery network and the second power delivery network are configured to have a substantially same voltage level.

3. The integrated circuit of claim 1, wherein the second circuit macro is configured to be in a low power mode.

4. The integrated circuit of claim 1, wherein the coupling circuit further comprises a control terminal coupled to the power control signal; and wherein the coupling circuit is configured to couple or decouple the second power delivery network to the first power delivery network in response to the power control signal.

5. The integrated circuit of claim 4, wherein the coupling circuit comprises a plurality of switches configured to couple the second power delivery network to the first power delivery network in response to the power control signal.

6. The integrated circuit of claim 5, wherein the coupling circuit is adjacent to both the first circuit macro and the second circuit macro.

7. The integrated circuit of claim 6, wherein the plurality of switches is distributed along a boundary of the first circuit macro and the second circuit macro.

8. The integrated circuit of claim 1, wherein the coupling circuit comprises a programmable fuse, wherein the programmable fuse statically couples the second power delivery network to the first power delivery network.

9. The integrated circuit of claim 1, wherein the first circuit macro, the second circuit macro, and the coupling circuit are integrated into one die.

10. The integrated circuit of claim 1 further comprising a first plurality of bonding pads coupled to the first power delivery network and a second plurality of bonding pads coupled to the second power delivery network.

11. The integrated circuit of claim 1, wherein the first circuit macro comprises a processor or a memory.

12. The integrated circuit of claim 1 further comprising:
    a third circuit macro having a third power delivery network; and
    a second coupling circuit configured to couple the third power delivery network to the first power delivery network.

13. The integrated circuit of claim 12, wherein the second power delivery network is configured to couple to the first power delivery network in a first operation mode and the third power delivery network is configured to couple to the first power delivery network in a second operation mode; and wherein the second power delivery network is configured to decouple from the first power delivery network in the second operation mode and the third power delivery network is configured to decouple from the first power delivery network in the first operation mode.

14. A method, comprising:
supplying power to a first circuit macro through a first power delivery network;
supplying power to a second circuit macro through a second power delivery network; and
merging the second power delivery network with the first power delivery network through a coupling circuit in response to a power control signal.

15. The method of claim 14, wherein the first power delivery network and the second power delivery network are configured to have a substantially same voltage level.

16. The method of claim 15 further comprising operating the second circuit macro in a low power mode.

17. The method of claim 14, wherein the coupling circuit comprises a plurality of switches configured to couple the second power delivery network to the first power delivery network in response to the power control signal.

18. The method of claim 14 further comprising:
supplying power to a third circuit macro through a third power delivery network; and
coupling the third power delivery network to the first power delivery network through a second coupling circuit.

19. A system, comprising:
a packaging substrate;
a first power delivery network;
a second power delivery network;
a plurality of bonding pads coupled to an integrated circuit die and to the packaging substrate, wherein a first set of the plurality of bonding pads couples to the first power delivery network and a second set of the plurality of bonding pads couples to the second power delivery network; and
a coupling circuit coupled to the first power delivery network and to the second power delivery network, wherein the second power delivery network is coupled to the first power delivery network through the coupling circuit; and wherein the first power delivery network and the second power delivery network are configured to have a substantially same voltage level.

20. The system of claim 19, wherein the first power delivery network is configured to supply power to a first circuit macro and the second power delivery network is configured to supply power to a second circuit macro; and wherein the second circuit macro is configured to be in a low power mode.

21. The system of claim 19 further comprising a plurality of packaging bumps coupled to the packaging substrate, wherein a first set of the plurality of packaging bumps couples to the first power delivery network and a second set of the plurality of packaging bumps couples to the second power delivery network.

22. The system of claim 19, wherein the coupling circuit further comprises a control terminal coupled to a control signal; and wherein the coupling circuit is configured to couple the second power delivery network to the first power delivery network in response to the control signal.

23. A device, comprising:
a first circuit macro comprising a first power delivery network;
a second circuit macro comprising a second power delivery network; and
means for merging the second power delivery network to the first power delivery network in response to a power control signal.

24. The device of claim 23 further comprising means for operating the second circuit macro in a low power mode.

25. The device of claim 23 further comprising:
a third circuit macro having a third power delivery network; and
means for coupling the third power delivery network to the first power delivery network.

26. The device of claim 25, wherein the means for coupling the second power delivery network to the first power delivery network is configured to couple the second power delivery network to the first power delivery network in a first operation mode but not in a second operation mode; and wherein the means for coupling the third power delivery network to the first power delivery network is configured to couple the third power delivery network to the first power delivery network in the second operation mode but not in the first operation mode.

* * * * *